(12) United States Patent
Shin et al.

(10) Patent No.: US 10,787,530 B2
(45) Date of Patent: Sep. 29, 2020

(54) LARGE POLYTETRAFLUOROETHYLENE INTEGRATING SPHERE FABRICATION METHOD

(71) Applicant: Korea Research Institute of Standards and Science, Daejeon (KR)

(72) Inventors: Dong-Joo Shin, Daejeon (KR); Ki-Lyong Jeong, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 360 days.

(21) Appl. No.: 15/650,594

(22) Filed: Jul. 14, 2017

(65) Prior Publication Data

US 2018/0016374 A1 Jan. 18, 2018

(30) Foreign Application Priority Data

Jul. 18, 2016 (KR) .................. 10 2016 0090528

(51) Int. Cl.
| | | |
|---|---|---|
| *C08F 214/26* | (2006.01) | |
| *B29C 43/14* | (2006.01) | |
| *B29C 43/40* | (2006.01) | |
| *B29C 53/76* | (2006.01) | |
| *B29L 11/00* | (2006.01) | |
| *B29K 27/18* | (2006.01) | |

(52) U.S. Cl.
CPC ............ *C08F 214/26* (2013.01); *B29C 43/14* (2013.01); *B29C 43/40* (2013.01); *B29C 53/76* (2013.01); *A63B 2243/0025* (2013.01); *B29C 2043/144* (2013.01); *B29K 2027/18* (2013.01); *B29L 2011/0016* (2013.01)

(58) Field of Classification Search
CPC ....... C08F 214/26; B29C 43/40; B29C 43/14; B29C 53/76; B29C 2043/144; B29C 2043/185; B29C 43/52; B29K 2027/18; B29L 2011/0016; G01J 3/0254; B29D 11/00413; A63B 2243/0025
See application file for complete search history.

(56) References Cited

U.S. PATENT DOCUMENTS 3,946,136 A * 3/1976 Fitz .................. B29C 65/5057
428/422

FOREIGN PATENT DOCUMENTS

| CN | 85200717 U | * | 1/1986 |
| CN | 100337098 C | * | 9/2007 |
| JP | 2009-222538 A | | 10/2009 |

OTHER PUBLICATIONS

CN-100337098-C Machine Translation of Description.*
CN-85200717-U Machine Translation of Description.*
JP-2009222538-A Machine Translation of Description.*

* cited by examiner

*Primary Examiner* — Christopher T Schatz
*Assistant Examiner* — Cynthia L Schaller
(74) *Attorney, Agent, or Firm* — Jenkins, Wilson, Taylor & Hunt, P.A.

(57) ABSTRACT

An integrating sphere includes twelve pentagonal spherical shells and twenty hexagonal spherical shells. The hexagonal spherical shell includes a first circular spherical shell having a first diameter and six first auxiliary spherical shells formed by cutting the first circular spherical shell. The pentagonal spherical shell includes a first circular spherical shell having the first diameter and five second auxiliary spherical shell formed by cutting a second circular spherical shell having a second diameter.

2 Claims, 9 Drawing Sheets

LARGE POLYTETRAFLUOROETHYLENE INTEGRATING SPHERE FABRICATION METHOD

CROSS-REFERENCE TO RELATED APPLICATIONS

This U.S. non-provisional application claims priority under 35 U.S.C. § 119 to Korea Patent Application No. 10-2016-0090528 filed on Jul. 18, 2016, the entirety of which is hereby incorporated by reference herein.

TECHNICAL FIELD

The present disclosure relates to polytetrafluoroethylene (PTFE) integrating spheres and, more particularly, to a large PTFE sphere.

BACKGROUND

Integrating spheres are widely used in optical measurement. Integrating spheres may be classified into $BaSO_4$ integrating spheres and polytetrafluoroethylene (PTFE) integrating spheres according to reflecting materials coated on the inside thereof.

A $BaSO_4$ integrating sphere may be used in visible light of about 300 nm or more and near infrared. However, the $BaSO_4$ integrating sphere cannot be used in an ultraviolet region due to low reflectivity. It is easy to coat $BaSO_4$. The $BaSO_4$ integrating sphere may be used to fabricate a large integrating sphere (having a diameter of about 3 m) and is low in cost.

A PTFE integrating sphere may be used even in ultraviolet of 200 nm or more, visible ray, and infrared. It is difficult to coat PTFE. A commercialized PTFE integrating sphere uses PTFE molded in a compressed-heated-solid state. In general, the PTFE integrating sphere is used to fabricate a small integrating sphere. The PTFE integrating sphere is very high in cost. It is difficult to fabricate a large integrating sphere by using the PTFE integrating sphere. Even if it is possible to fabricate a large integrating sphere, much cost is required.

The inventor of the present subject matter published a paper on fabrication of a small PTFE integrating sphere (Optical Society of Korea, 2005). PTFE is compressively molded in the form of pentagon and hexagon to be coated on the inside of a hollow spherical frame. A PTFE coating technique developed in 2005 may be applied to fabrication of a small integrating sphere of about 50 cm or less. However, it is difficult to directly apply the PTFE molding technique to an integrating sphere having a diameter of 1 m or more. Specifically, much cost is required to manufacture a compression jig of pentagon and hexagon. Moreover, even when a jig is manufactured, it is difficult to uniformly compress the PTFE. Even when the PTFE is compressively molded, it is difficult to coat the PTFE on a spherical frame. That is, it is fragile because it is too large. Accordingly, there is a need for a technique to fabricate a large PTFE integrating sphere.

SUMMARY

Embodiments of the present disclosure provide a large PTFE integrating sphere having a diameter of 1 m or more.

An integrating sphere according to an example embodiment of the present disclosure includes twelve pentagonal spherical shells and twenty hexagonal spherical shells. The hexagonal spherical shell includes a first circular spherical shell having a first diameter and six first auxiliary spherical shells formed by cutting the first circular spherical shell. The pentagonal spherical shell includes a first circular spherical shell having the first diameter and five second auxiliary spherical shell formed by cutting a second circular spherical shell having a second diameter.

In an example embodiment of the present disclosure, the pentagonal spherical shell and the hexagonal spherical shell may be formed by compressing polytetrafluoroethylene (PTFE).

In an example embodiment of the present disclosure, a compression density of the PTFE may be 1.2 $g/cm^3$.

An integrating sphere according to an example embodiment of the present disclosure includes twelve pentagonal spherical shells and twenty hexagonal spherical shells. The hexagonal spherical shell includes a first circular spherical shell having a first diameter and six first auxiliary spherical shells formed by cutting the first circular spherical shell. The pentagonal spherical shell includes a first circular spherical shell having the first diameter and five second auxiliary spherical shells formed by cutting a second circular spherical shell having a second diameter. A method for fabricating the integrating sphere includes: preparing a first molding frame for forming a first circular spherical shell and a second molding frame for forming a second circular spherical shell; providing a predetermined PTFE powder to the first molding frame to compressively mold the first circular spherical shell; providing a predetermined PTFE powder to the second molding frame to compressively mold the second circular spherical shell; cutting the compressively molded first circular spherical shell to provide a first auxiliary spherical shell; cutting the compressively molded second circular spherical shell to provide a second auxiliary spherical shell; coating a bonding layer on a hemisphere for an integrating sphere and fitting together the first circular spherical shell, the first auxiliary spherical shell, and the second auxiliary spherical shell to form a PTFE hemispherical shell; and combining a recompression hemisphere with the hemisphere for an integrating sphere with the PTFE hemispherical shell interposed therebetween to recompress the PTFE hemispherical shell.

In an example embodiment of the present disclosure, a compression density of the PTFE may be 1.2 $g/cm^3$.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
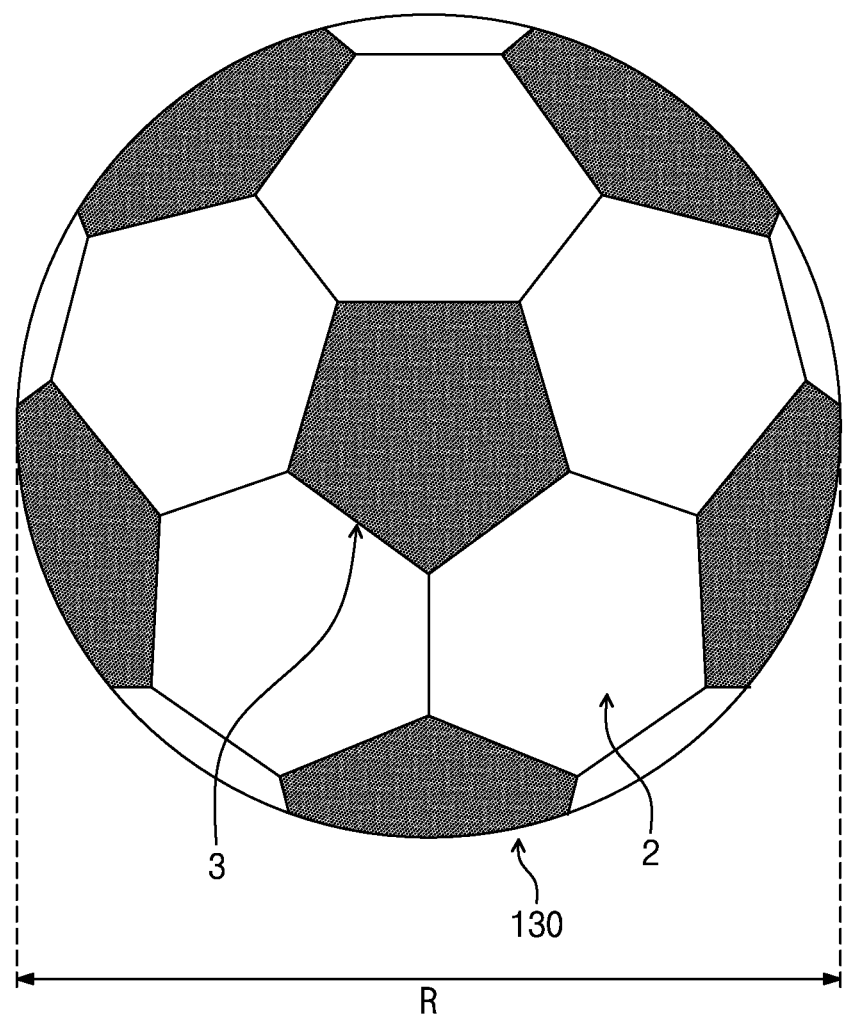
FIG. 1 is a perspective view illustrating a spherical shell of a PTFE integrating sphere according to an example embodiment of the present disclosure.

Example embodiments will now be described more fully with reference to the accompanying drawings, in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of example embodiments of the present disclosure to those of ordinary skill in the art. In the drawings, the thicknesses of layers and regions are exaggerated for clarity. Like reference characters and/or numerals in the drawings denote like elements, and thus their description may be omitted.

FIG. 1 is a perspective view illustrating a spherical shell of a PTFE integrating sphere according to an example embodiment of the present disclosure.

Figure 2:
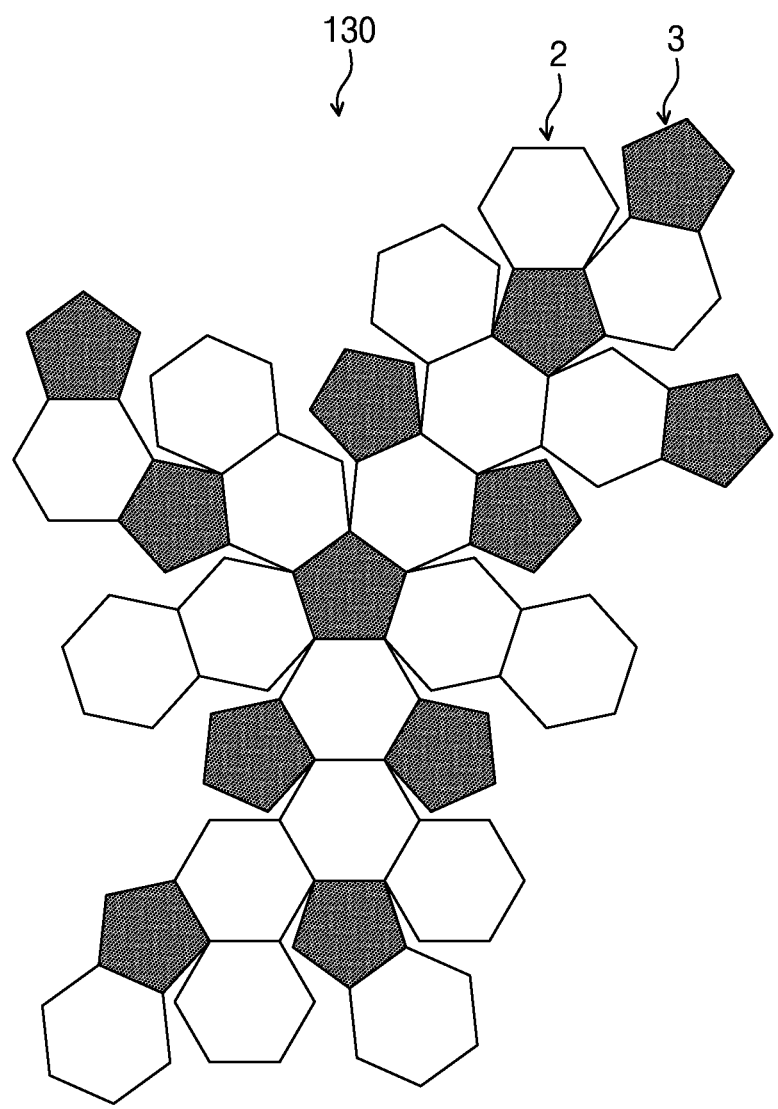
FIG. 2 is a developed view illustrating a pentagonal spherical shell and a hexagonal spherical shell constituting the PTFE integrating sphere in FIG. 1.

FIG. 2 is a developed view illustrating a pentagonal spherical shell and a hexagonal spherical shell constituting the PTFE integrating sphere in FIG. 1.

Figure 3:
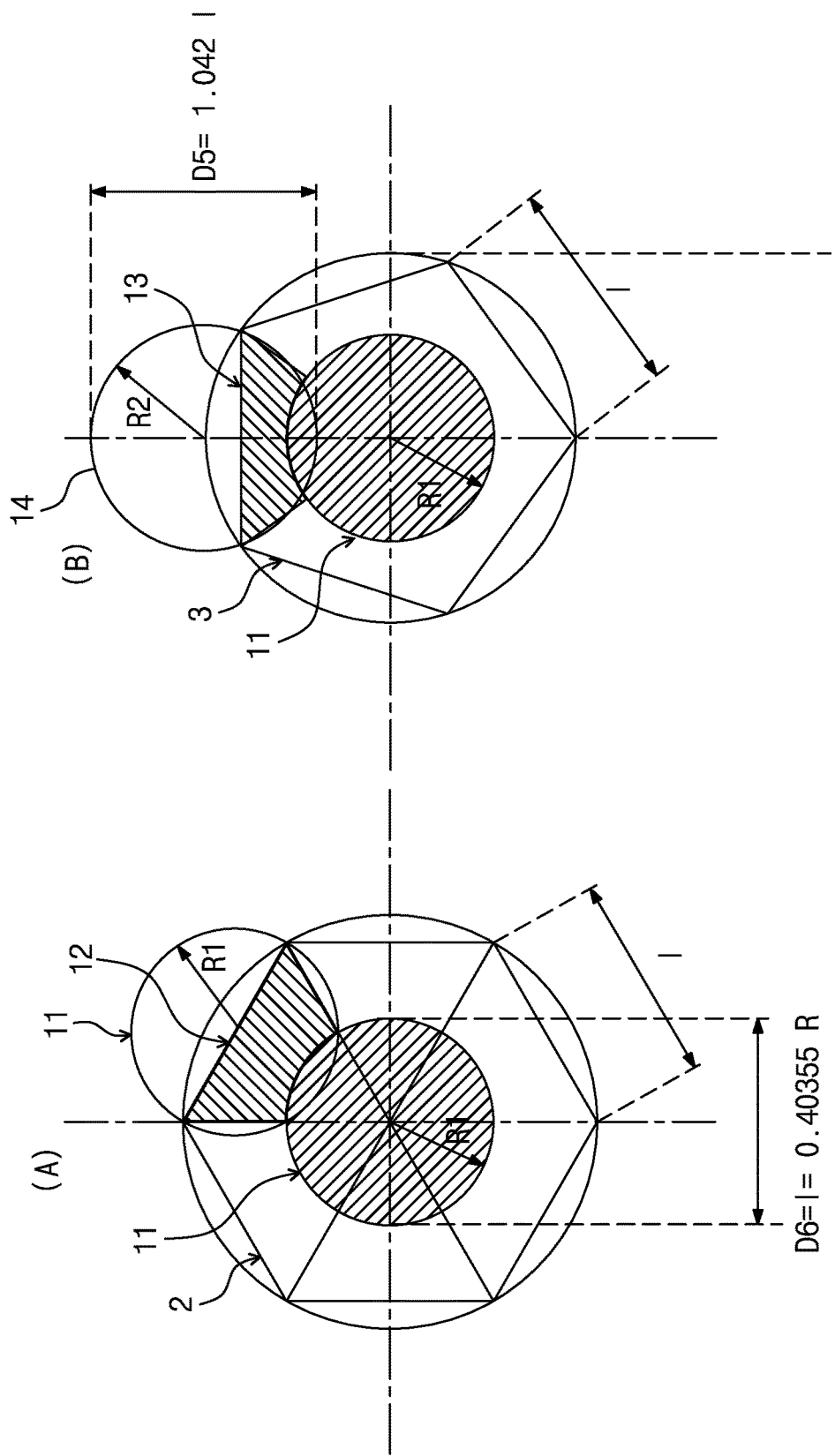
FIG. 3 is a top plan view illustrating a pentagonal spherical shell and a hexagonal spherical shell according to an example embodiment of the present disclosure.

FIG. 3 is a top plan view illustrating a pentagonal spherical shell and a hexagonal spherical shell according to an example embodiment of the present disclosure.

Figure 4:
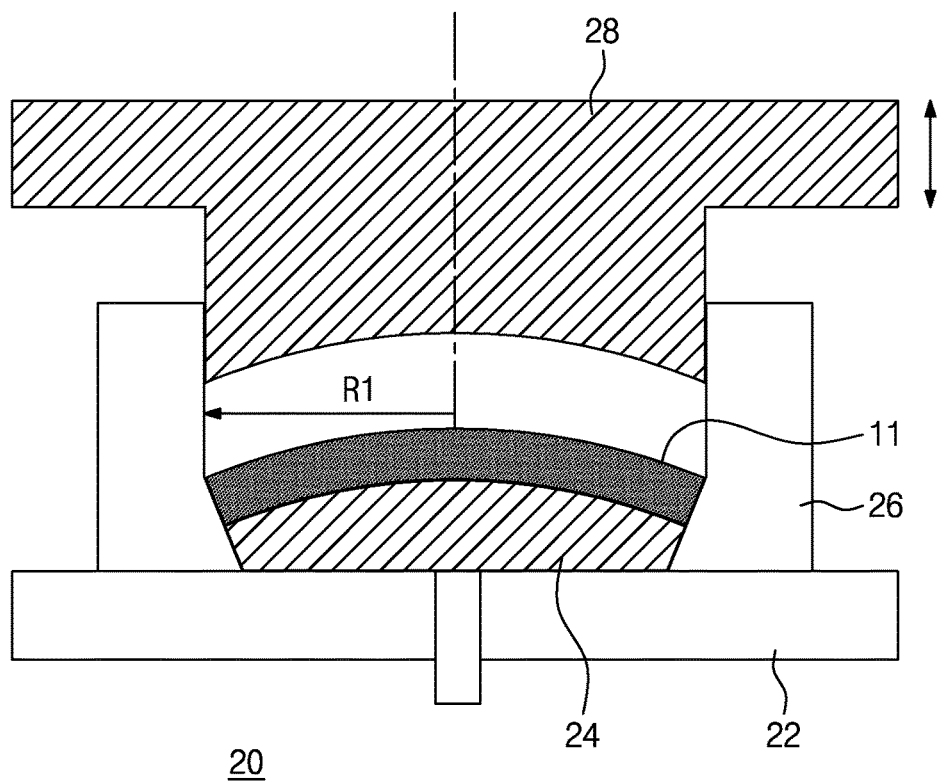
FIG. 4 is a cross-sectional view of a first molding frame.

FIG. 4 is a cross-sectional view of a first molding frame.

Figure 5:
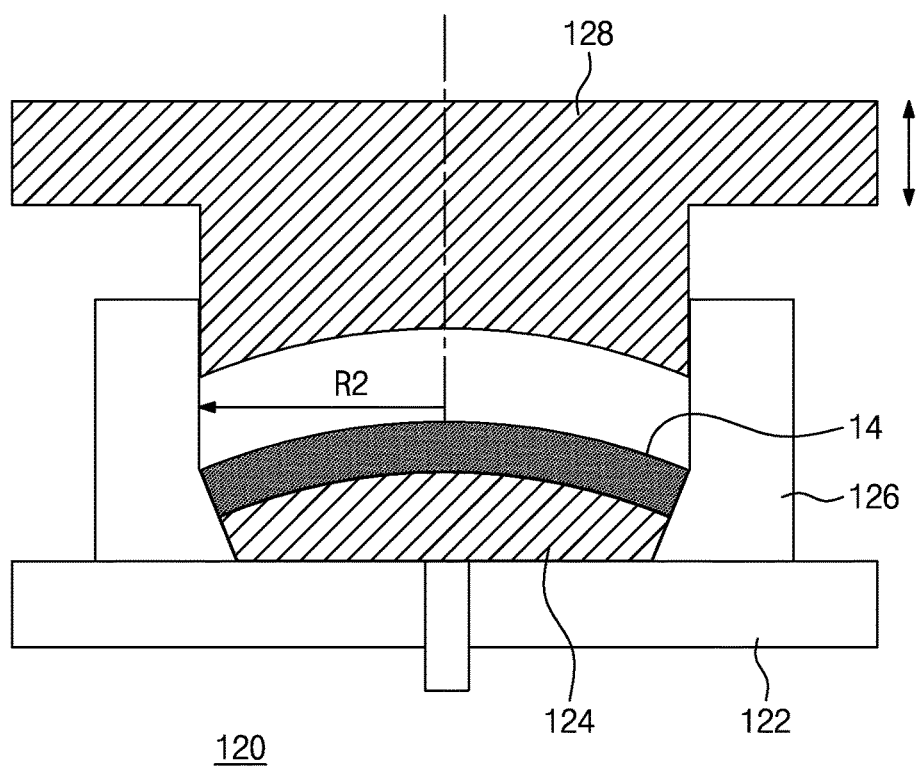
FIG. 5 is a cross-sectional view of a second molding frame.

FIG. 5 is a cross-sectional view of a second molding frame.

Figure 6:
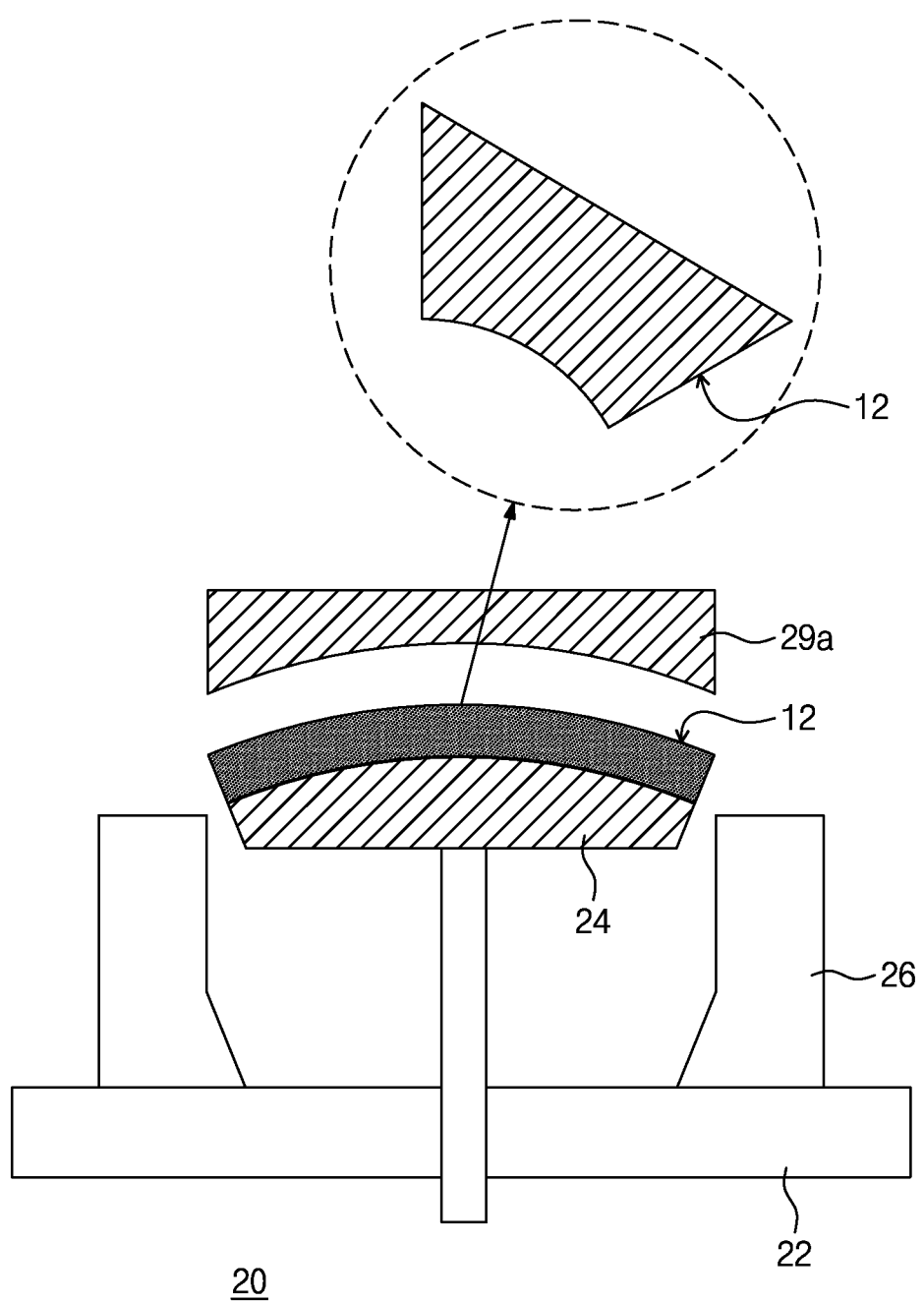
FIG. 6 is a cross-sectional view of a first molding frame and a first model frame.

FIG. 6 is a cross-sectional view of a first molding frame and a first model frame.

Figure 7:
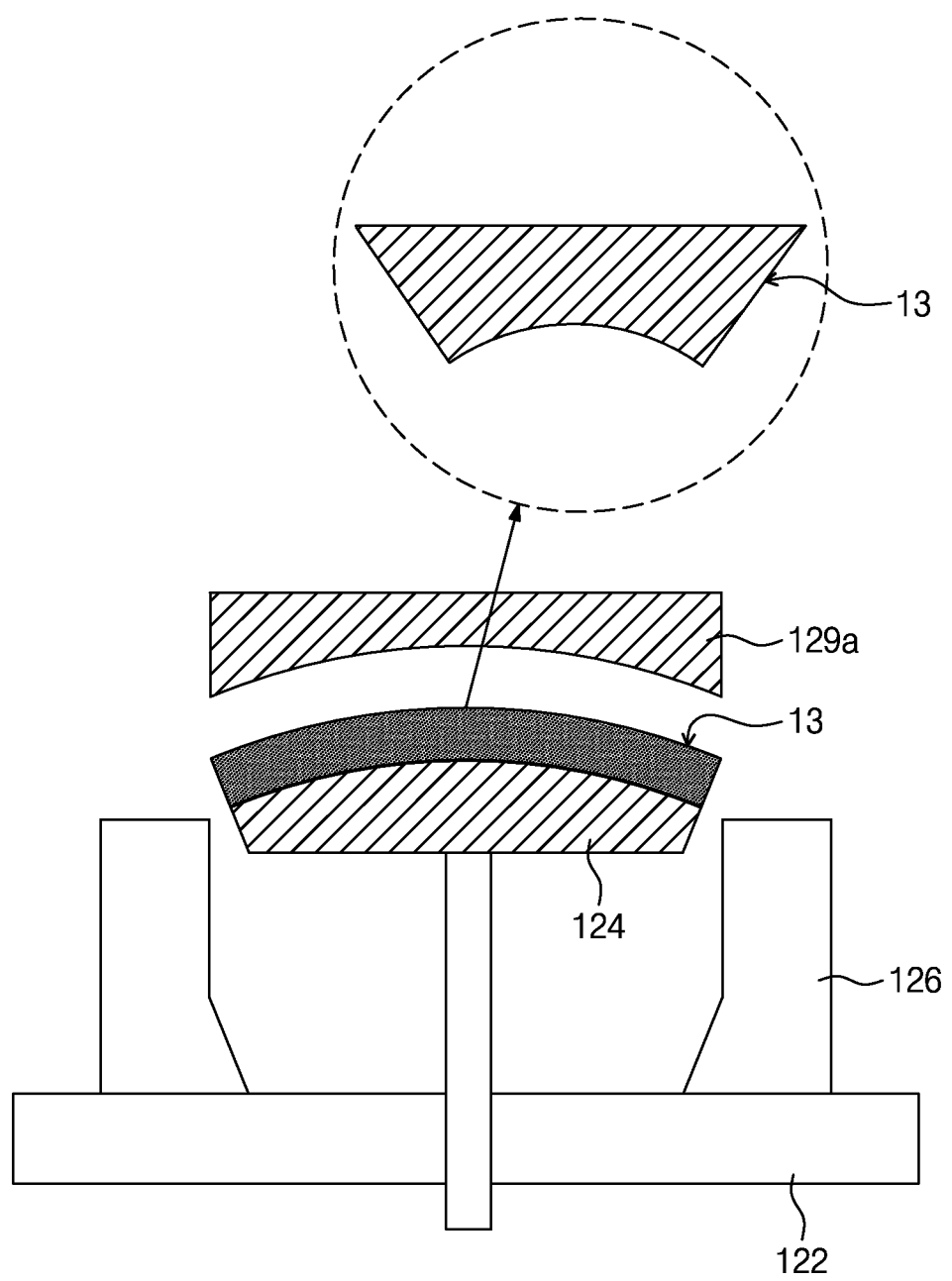
FIG. 7 is a cross-sectional view of a second molding frame and a second model frame.

FIG. 7 is a cross-sectional view of a second molding frame and a second model frame.

Figure 8:
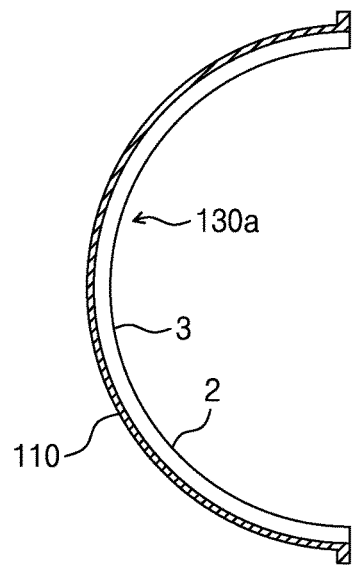
FIGS. 8 and 9 are cross-sectional views illustrating a hemisphere for an integrating sphere and a PTFE hemispherical shell.
Figure 9:
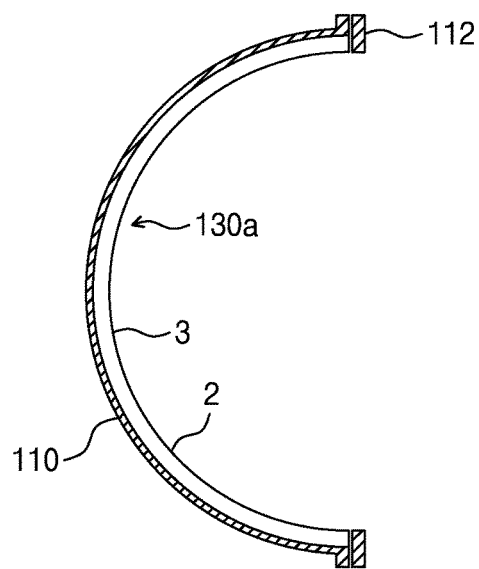

FIGS. 8 and 9 are cross-sectional views illustrating a hemisphere for an integrating sphere and a PTFE hemispherical shell.

Figure 10:
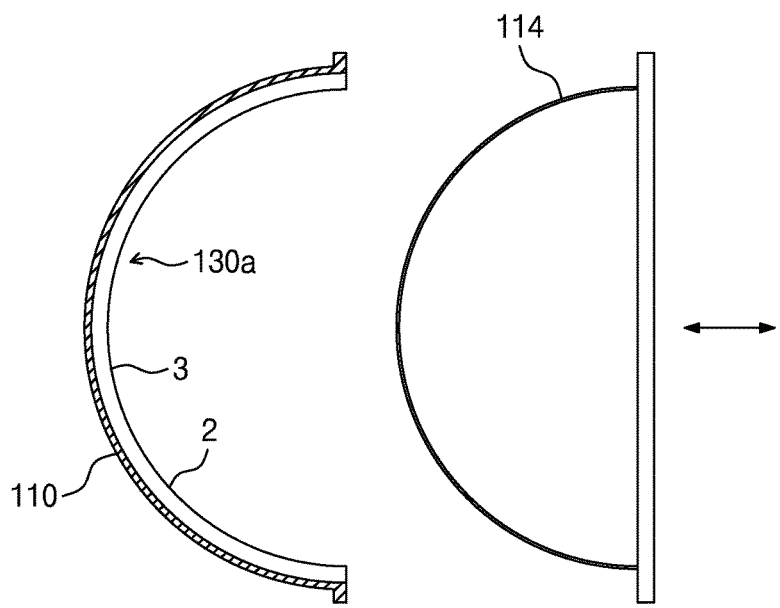
FIG. 10 is a cross-sectional view illustrating a hemisphere for an integrating sphere and a recompression hemisphere.

FIG. 10 is a cross-sectional view illustrating a hemisphere for an integrating sphere and a recompression hemisphere.

Figure 11:
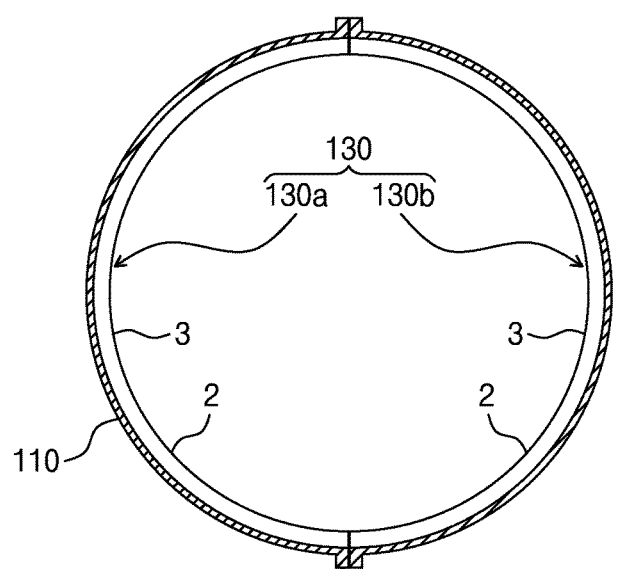
FIG. 11 is a cross-sectional view of an integrating sphere.

FIG. 11 is a cross-sectional view of an integrating sphere.

Referring to FIGS. 1 through 11, an integrating sphere 130 includes a1 twelve pentagonal spherical shells 3 and twenty hexagonal spherical shells 2. The hexagonal spherical shell 2 includes a first circular spherical shell 11 having a first diameter and six first auxiliary spherical shells 12 formed by cutting the first circular spherical shell 11. The pentagonal spherical shell 3 includes the first circular spherical shell 11 having the first diameter and five second auxiliary spherical shell 13 formed by cutting a second circular spherical sphere 14 having a second diameter. A PTFE compression density may be 1.2 g/cm³.

A method for fabricating an integrating sphere according to an example embodiment of the present disclosure includes preparing a first molding frame for forming a first circular spherical shell and a second molding frame for forming a second circular spherical shell; providing a predetermined PTFE powder to the first molding frame to compressively mold the first circular spherical shell; providing a predetermined PTFE powder to the second molding frame to compressively mold the second circular spherical shell; cutting the compressively molded first circular spherical shell to provide a first auxiliary spherical shell; cutting the compressively molded second circular spherical shell to provide a second auxiliary spherical shell; coating a bonding layer on a hemisphere for an integrating sphere and fitting together the first circular spherical shell, the first auxiliary spherical shell, and the second auxiliary spherical shell to form a PTFE hemispherical shell; and combining a recompression hemisphere with the hemisphere for an integrating sphere with the PTFE hemispherical shell interposed therebetween to recompress the PTFE hemispherical shell.

An integrating sphere is fabricated by bonding PTFE, where a pentagonal spherical shell and a hexagonal spherical shell are compressively molded, to the inside of a hollow hemisphere for an integrating sphere. A pentagonal spherical shell and a hexagonal spherical shell suitable for the integrating sphere are too large to be compressed at uniform density. Thus, the pentagonal spherical shell and the hexagonal spherical shell should be compressed at uniform density after being divided into small-sized spherical shells.

A pentagonal spherical shell and a hexagonal spherical shell suitable for the integrating sphere are divided in the forms of circle and out-circle to compressively mold PTFE to a thickness between several millimeters and several tens of millimeters. Preferably, a thickness of the spherical shell may be 12 millimeters.

The hexagonal spherical shell 2 includes a first circular spherical shell 11 having a first diameter R1 and six first auxiliary spherical shell 12 formed by cutting the first circular spherical shell 11. The pentagonal spherical shell 3 includes a first circular spherical shell 1 having the first diameter R1 and five second auxiliary spherical shell 13 formed by cutting a second circular spherical shell 14 having a second diameter R2.

A first molding frame 20 for forming the first circular spherical shell 11 and a second molding frame 120 for the second circular spherical shell 14 are prepared.

In the first molding frame 20, a diameter D6 is equal to a length l of one side of a hexagon. The length l of one side is 0.40355 R (R being a radius of an integrating sphere). A surface of an inner sphere of the first molding frame 20 is processed with uniform roughness (about 3 micrometers). The first molding frame 20 includes a base 22, a lower frame 24, a sidewall 26, and an upper frame 28.

In the second molding frame 120, a diameter D5 is 1.042 l (l being a length l of one side of a pentagon). The length l of one side is 0.40355 R (R being a radius of an integrating sphere). The second molding frame 120 includes a base 122, a lower frame 124, a sidewall 126, and an upper frame 128.

The hexagonal spherical shell 2 includes a first circular spherical shell 11 having a first diameter and six first auxiliary spherical shells 12 formed by cutting the first circular spherical shell 11. The first auxiliary spherical shell 12 is cut by using the first model frame 29a in the first circular spherical shell 11.

The pentagonal spherical shell 3 includes a first circular spherical shell 11 having a first diameter and five second auxiliary spherical shell 13 formed by cutting a second circular spherical shell 14 having a second diameter. The second auxiliary spherical shell 13 is cut by using the second model frame 129 in the second circular spherical shell 14.

Compressive molding of first circular spherical shell commonly used in pentagonal spherical shell and hexagonal spherical shell (1) After PTFE is weighed on a scale such that PTFE compression density is 1.2 g/cm³, the first circular spherical shell 11 is poured into a center portion of the first molding frame 20. (2) The first circular spherical shell 11 is evenly spread out to make a thickness of the PTFE uniform. (3) The first circular spherical shell 11 is compressed to cover the upper frame 28 of the first molding frame 20 and to adhere to the lower frame 24 of the first molding frame 20. (4) The first circular spherical shell 11 remains compressed for about 20 minutes. (5) The upper frame 28 of the first molding frame 20 is separated and the lower frame 24 of the first molding frame 20 is pushed up to take out the compressed PTFE.

First Auxiliary Spherical Shell (1) After the first auxiliary spherical shell 12 is compressed using the first molding frame 20 in the same molding procedure as the first circular spherical shell 11, the first auxiliary spherical shell 12 remains compressed for about 20 minutes. (2) An upper portion of the first molding frame 20 is separated and a lower portion of the first molding frame 20 is pushed up. (3) After the first model frame 29a is placed on an upper surface of the first circular spherical shell 11, the PTFE is cut using a plastic knife. (4) The PTFE of the same shape as the first model frame 29a is separated (two first auxiliary spherical shells can be fabricated from one first circular spherical shell).

Second Auxiliary Spherical Shell (1) After the second auxiliary spherical shell 13 is compressed using the second molding frame 120 in the same molding procedure as the first circular spherical shell 11, the second auxiliary spherical shell 13 remains compressed for about 20 minutes. (2) The upper frame 129 of the second molding frame 120 is separated and the lower frame 124 of the second molding frame 120 is pushed up. (3) After the second model frame 129a is placed on the upper surface of the first circular spherical shell 11, the second circular spherical shell 14 is cut using a plastic knife. (4) The second circular spherical shell 13 of the same shape as the second model frame 129a is separated (two second auxiliary spherical shell can be fabricated from one second circular spherical shell).

Coating Procedure

A bonding layer is coated on the hemisphere 110 for an integrating sphere and the first circular spherical shell 11, the first auxiliary spherical shell 12, and the second auxiliary spherical shell 13 are fitted together to form a PTFE hemispherical shell 130a. (1) A bonding layer is coated on a hollow hemisphere for an integrating sphere. The bonding layer may be lubricant. (2) The first circular spherical shell 11 is slidably sent from an edge to a center portion of the hemisphere for an integrating sphere. (3) The second auxiliary spherical shell 13 providing an external shape of a pentagonal spherical shell is sent to the surrounding of the first circular spherical shell 11 in the same manner and the second auxiliary spherical shell 13 and the first circular spherical shell 13 adhere to each other to form a pentagonal shape. (4) The first auxiliary spherical shell 12 constituting a hexagonal exterior adheres to pentagonal one side. (5) The first circular spherical shell 11 constituting a hexagon adheres. (6) In the same manner, the pentagonal spherical shell 3 and the hexagonal spherical shell 2 bond to the hemisphere 110 for an integrating sphere. (7) A ring-shaped auxiliary frame 112 is combined with the hemisphere 110 for an integrating sphere. A gap formed at the edge of the hemisphere 110 is filled with powder formed by grinding compressed PTFE to complete a PTFE hemispherical shell 130a.

Recompression Procedure

A recompression hemisphere 114 is combined with the hemisphere 110 for an integrating sphere with the PTFE hemispherical shell 130 interposed therebetween to recompress the PTFE hemispherical shell 130a. (1) The PTFE hemispherical shell 130a bonding to the hemisphere 110 for an integrating shell is compressed by the recompression hemisphere 114. A radius of an internal surface of the hemisphere 110 for an integrating sphere is greater than a radius of an external surface of the recompression hemisphere 114. A difference between the radii may be substantially equal to a thickness of an integrating spherical shell. (2) The recompressed PTFE hemispherical shell 130a remains combined for about 24 hours. (3) Holes required for the integrating spherical shell are completed by digging the combined PTFE hemispherical shell 130a. (4) A pair of recompressed PTFE hemispherical shells 130a and 130b are combined with each other to provide an integration shell 130.

According to the above-described method for fabricating an integrating sphere, a large PTFE integrating sphere may be fabricated using a circular molding frame. A density of the large PTFE integrating sphere is uniform. Since only a first molding frame and a second molding frame are used, easy fabrication and low cost may be achieved. Since a circular molding frame is used, PTFE may be easily compressed and molded. The fabrication cost is low. The PTFE integrating sphere may be easily repaired while being used.

Although the present disclosure and its advantages have been described in detail, it should be understood that various changes, substitutions and alterations can be made herein without departing from the spirit and scope of the disclosure as defined by the following claims.

What is claimed is:

1. A method for fabricating an integrating sphere including twelve pentagonal spherical shells and twenty hexagonal spherical shells, wherein:

each of the hexagonal spherical shells includes a first circular spherical shell having a first diameter and six first auxiliary spherical shells also having the first diameter, and each of the pentagonal spherical shells includes another first circular spherical shell having the first diameter and five second auxiliary spherical shells formed from a second circular spherical shell having a second diameter, the method comprising:

preparing a first molding frame for forming the first circular spherical shell and a second molding frame for forming the second circular spherical shell;

providing a PTFE powder to the first molding frame;

compressively molding the first circular spherical shell with the PTFE powder on the first molding frame to form a compressively molded first circular spherical shell;

providing a PTFE powder to the second molding frame;

compressively molding the second circular spherical shell with the PTFE powder on the second molding frame to form a compressively molded second circular spherical shell;

cutting the compressively molded first circular spherical shell to provide the first six auxiliary spherical shells;

cutting the compressively molded second circular spherical shell to provide the second five auxiliary spherical shells;

coating a bonding layer on a hemisphere for the integrating sphere and fitting together uncut compressively molded first circular spherical shells with a plurality of the first six auxiliary spherical shells and the second five auxiliary spherical shells to form a PTFE hemispherical shell; and recompressing the PFTE hemispherical shell by combining a recompression hemisphere with the hemisphere, where the PTFE hemispherical shell is interposed therebetween.

2. The method as set forth in claim 1, wherein:
a compression density of the PTFE is 1.2 g/cm$^3$.

* * * * *